United States Patent [19]

Kinoshita et al.

[11] Patent Number: 4,870,118

[45] Date of Patent: Sep. 26, 1989

[54] POWDERY COPOLYMERS OF VINYL ESTER-ETHYLENE

[75] Inventors: Masafumi Kinoshita; Shuichi Maeda; Akira Urabe, all of Osaka, Japan

[73] Assignee: Dainippon Ink and Chemicals, Inc., Tokyo, Japan

[21] Appl. No.: 48,334

[22] Filed: May 11, 1987

[51] Int. Cl.$^4$ .......................... B29C 71/02; B32B 5/16; B32B 27/30; C08K 9/04
[52] U.S. Cl. .................................... 523/207; 427/222; 427/213.31; 427/374.1; 428/402; 428/403; 428/407; 523/205
[58] Field of Search ............... 523/207, 205; 428/402, 428/403, 407; 524/904; 427/213.31, 222, 422, 443, 374.1

[56] References Cited

U.S. PATENT DOCUMENTS

| | | | |
|---|---|---|---|
| 3,779,785 | 12/1973 | Stiles et al. | 427/222 |
| 3,793,242 | 2/1974 | Havsky | 523/207 |
| 3,909,488 | 9/1975 | Consoli | 523/207 |
| 3,911,193 | 10/1975 | Resz et al. | 427/222 |
| 4,348,492 | 9/1982 | Shasha et al. | 523/207 |
| 4,481,328 | 11/1984 | Harreus et al. | 524/904 |
| 4,614,674 | 9/1986 | Lauterbach | 524/904 |
| 4,675,140 | 6/1987 | Sparks et al. | 425/5 |
| 4,704,330 | 11/1987 | Moore et al. | 427/422 |

*Primary Examiner*—Allan M. Lieberman
*Attorney, Agent, or Firm*—Armstrong, Nikaido, Marmelstein, Kubovcik & Murray

[57] ABSTRACT

A treated powdery copolymer of vinyl ester-ethylene comprises a powdery vinyl ester-ethylene copolymer. The surface of the copolymer is coated with a wax having a melting point of at least 40° C., at least said melting point.

8 Claims, No Drawings

POWDERY COPOLYMERS OF VINYL ESTER-ETHYLENE

FIELD OF THE INVENTION

The present invention relates to a powdery vinyl ester-ethylene copolymer (hereinafter referred to as VEE resin) which is coated with a wax and which is resistant to agglomeration, and also to a vinyl chloride copolymer resin composition containing the wax-coated VEE copolymer.

BACKGROUND OF THE INVENTION

Copolymers of ethylene and a vinyl ester of an aliphatic carboxylic acid, such as vinyl acetate, etc., have been used as a property improving agent for rubbers and synthetic resins because of their excellent properties. In particular, such copolymers have been noted with keen interest as blending agents for improving the properties such as processability, impact strength, melt fluidity, etc., of vinyl chloride resins.

A suitable form of such blending agents for accomplishing uniform mixing is preferably a powdery form. However, VEE resins are generally produced by suspension polymerization or by emulsion polymerization method, and the copolymer obtained as a single sized form by such polymerization methods is in a state wetted by the aqueous medium. Accordingly, it is necessary to remove the aqueous medium by drying. However, on drying, the copolymer particles tend to agglomerate with each other owing to the low softening point and high tackiness of the copolymer, and hence it is very difficult to obtain the VEE resin in a dry powdery form. This tendency is particularly severe in VEE resins having a vinyl ester content of about 40 to 70%, suitable for use as blending agents for PVC.

Various approaches have been proposed for forming VEE resin powders while preventing them from agglomerating. For example covering a powdery VEE resin with a fine powder of an inorganic compound or an organic compound is proposed in U.S. Pat. No. 3,463,751. However, in this case, the fine powder attached to the surfaces of the VEE resin particles is liable to be embedded in the VEE particles with the particles reverting to rubbery resin particles during storage. In particular, under loaded conditions, the anti-sticking capability will be lost causing agglomeration of the particles. On the other hand, if a large amount of the fine powder is used, a part of the fine powder falls off from the particles and accumulates on the bottom of the container, and a homogeneous VEE resin is not obtained. There are other disadvantages in the case of blending a resin such as PVC, etc., with such VEE resin particles. When molding or forming the resin, the transparency of the resin is lowered and when using the VEE particles as a solution, the solution becomes opaque or forms precipitates.

British Pat. No. 1,511,146 describes that sticking of VEE resin particles may be prevented by coating the surface thereof with a surface active agent. However, although coating with a surface active agent may give an anti-sticking effect when the content of vinyl ester in the VEE resin is low, that effect becomes inadequate when the vinyl ester content is increased, and the resin particles are liable to agglomerate during storage. Increasing the amount of surface active agent causes the resin particles to be become sticky due to the presence of the surface active agent, and the water absorption resistance of the resin is lowered owing to the hydrophilic property of the surface active agent.

SUMMARY OF THE INVENTION

As the result of various investigations on forming powdery VEE resins while preventing sticking of the VEE resins, the inventors have discovered that sticking of particles of a powdery VEE resin with each other can be effectively prevented by coating the surface of the powdery VEE resin with a molten wax, and have succeeded in attaining the present invention based on the discovery.

Thus, according to this invention, there is provided a powdery VEE resin the surface of which is coated with a wax having a melting point of at least 40° C. at a temperature of at least the melting point of the wax.

According to another embodiment of this invention, there is provided a resin composition comprising the aforesaid powder VEE resin and a vinyl chloride resin.

DETAILED DESCRIPTION OF THE INVENTION

The wax which is used in this invention may be a natural wax, or a synthetic wax but it is necessary that its melting point be at least 40° C., preferably from 40° C. to 100° C., and most preferably from 55° C. to 85° C. If the melting point is lower than 40° C., there is a possibility of sticking of the VEE resin coated with the wax caused by body heat or in summer.

As such a wax, there are, for example, fatty acid waxes such as myristic acid, palmitic acid, stearic acid, behenic acid, montanic acid, brassidic acid, etc., higher alcohol waxes such as palmityl alcohol, stearyl alcohol, behenic alcohol, etc., ester waxes such as glycerol monostearate, sorbitan monostearate, etc., and further paraffin wax, etc. In the case of using the VEE resin for medical purposes or with foods, non-toxic waxes such as ester waxes are preferred.

The amount of wax is added is preferably from 0.5 to 10 parts by weight, and more preferably from 2 to 8 part by weight per 100 parts by weight of the VEE resin with a view to both the sticking prevention effect and the properties of the VEE resin.

The VEE resin of this invention is a copolymer of ethylene and a vinyl ester of an aliphatic carboxylic acid as the main components and can be prepared by bulk polymerization, by solution polymerization, by suspension polymerization, or by emulsion polymerization.

The particle size of the particles or powder of the VEE resin before coating with the wax is preferably from 0.05 mm to 5 mm (passed through a sieve of 300 to 4 mesh by JIS standard), and more preferably from 0.07 mm to 1.9 mm (passed through a sieve of 200 to 10 mesh).

The copolymerization ratio of the aliphatic carboxylic acid vinyl ester to ethylene in the VEE resin depends upon the kind of the vinyl ester to some extent but the copolymer having a copolymerization ratio of usually from about 30/70 to 80/20, and particularly from about 40/60 to 70/30 by weight is liable to stick to wax and thus is effectively used in this invention.

Examples of vinyl esters of aliphatic carboxylic acids for the VEE resin are vinyl formate, vinyl acetate, vinyl butyrate, vinyl versatate, etc.

Also, the copolymer of ethylene and the aliphatic carboxylic acid vinyl ester in this invention may be a random copolymer or a graft copolymer with other vinyl monomers in the range of less than a half of the copolymer. Examples of such vinyl monomers are acrylic acid, methacrylic acid, and the alkyl esters thereof, such as methyl acrylate, ethyl acrylate, butyl acrylate, methyl methacrylate, ethyl methacrylate, etc., aromatic vinyls such as styrene, vinyltoluene, etc., vinyl cyanides such as acrylonitrile, etc., vinyl halides such as vinyl chloride, etc., diene monomers such as butadiene, etc.

In addition, the above-described vinyl monomers having a solubility parameter of at least 8.5, and preferably from 8.6 to 9.8 are suitably used. Also, the solubility parameter of the VEE resin containing such a vinyl monomer is preferably from 8.5 to 9.5.

The solubility parameter of the monomer described above is according to the description of *Encyclopedia of Polymer Science and Technology* (published by Wiley Interscience Co., 1970). The solubility parameter of the multicomponent polymer is calculated on the assumption that the solubility parameter is an additive property.

The coating treatment of a wax on the powdery VEE resin in this invention is performed by heating the wax on the surface of the VEE resin particles to a temperature of from the melting point of the wax to the melting point (about 160° C.) of the VEE resin to coat the particles with the wax. In this case, the surface of the VEE resin particles may be uniformly coated in the completely molten state or the surface of the VEE resin particles may be uniformed coated with the wax in fine powdery and molten state. In addition, the treated powdery VEE resin of this invention can be produced by various other methods.

For example, the VEE resin particles and a wax are added to an aqueous medium at room temperature, and the temperature of the system is raised with stirring. The system is kept at a temperature of at least the melting point of the wax for a definite period of time to adsorb the molten wax onto the surface of the particles, and then the system is cooled below the melting point of the wax with stirring. The wax-coated VEE resin thus obtained is dried at a temperature lower than the melting point of the wax to provide the treated powdery VEE resin.

Also, alternatively, the VEE resin particles are mixed with the powder of a wax at room temperature, the temperature of the mixture is raised with stirring to heat the mixture to a temperature of at least the melting point of the wax followed by keeping the mixture at the temperature for a definite period of time while controlling the increase in temperature and stirring so that the VEE resin particles do not unite with each other, whereby the VEE resin coated with the wax is obtained.

In the case of producing the treated VEE resin as described above, other inorganic or organic powder sticking preventing agents may be used together with the wax within the scope of this invention. Examples of such sticking preventing agents are inorganic compounds such as silica, clay, calcium carbonate, titanium oxide, lead sulfate, talc, etc., fatty acid salts such as calcium stearate, barium stearate, barium ricinoleate, etc., and powdery resins such as polyvinyl chloride, polyethylene, etc. The addition amount thereof is from 0.5 to 5 parts by weight per 100 parts by weight of the VEE resin.

In another embodiment of this invention, the treated powdery VEE resin of the invention can be used as a mixture with other synthetic resin(s) and rubber(s). As such a synthetic resin or rubber, a powdery material is preferred. Examples thereof are vinyl chloride series resin such as polyvinyl chloride, etc., acrylic resins such as polymethyl methacrylate, etc., polyurethane resins, chlorinated polyethylene, acryl rubber, ethylene-propylene rubber, saturated polyester resin, polyethylene, polyamide, polystyrene, and butadiene rubbers such as styrene-butadiene rubber (STR), nitril-butadiene rubber (NBR), etc. It is preferred that the mixing ratio of the VEE resin is from 1 to 100 parts by weight, and particularly from 1 to 50 parts by weight per 100 parts by weight of the synthetic resin or rubber. When the VEE resin is used as a modifier for the synthetic resin or rubber, it is preferred that the VEE resin is used in an amount of from 1 to 10 parts by weight, and particularly from 1 to 5 parts by weight per 100 parts by weight of the synthetic resin or rubber.

The treated VEE resin of this invention has excellent properties and does not agglomerate at normal temperatures, when stored for a long period of time or at high temperatures in summer. The treated VEE resin has excellent properties, as illustrated hereinafter. In the case of blending the treated VEE resin of this invention with, for example, PVC, the processability, impact strength, and melt fluidity of of the PVC can be improved without causing separation in two layers or lowering the transparency and thermal stability of PVC unlike the case of using a conventional powdery sticking preventing agent. When using the treated VEE resin of this invention as a solution in a hydrocarbon solvent, neither reudction in transparency of the solvent nor precipitation occurs.

By utilizing the aforesaid effects, the treated powdery VEE resin of this invention can be not only very effectively used for improving the impact strentgh and other properties of PVC and other synthetic resins as described above, but also can be used in the form of a solution as various kinds of binders or used, or by itself, as a hot melt type adhesive, as an ink binder, for fluid dipping, or as a powdery elastomer. Thus, the treated powdery VEE resin of this invention has very many industrial applications.

The following examples are intended to illustrate the features of this invention more clearly, but not to limit it in any way. In addition, all parts and percentages in the examples and comparison examples, unless otherwise indicated, are by weight. Also, the evaluation methods for the forms and properties of polymers in the examples are as follows.

1. Pulverizability Property of Polymer

After sieving 200 parts of each polymer sample using a JIS standard sieve (5, 10, 16, 32, 60, 100, or 200 mesh), the amount of each residue was measured and the average particle size was obtained from the weighed average. When the average particle size is 10 mesh or larger, the polymer could be blended with PVC without causing any problems and hence the pulverizability in these cases was defined as satisfied.

2. Fluidity of Polymer Particles

The loosed bulk density (A)" of polymer particles and the "packed buld density (P)" thereof after applying tapping thereto for 3 minutes were measured using a powder tester (Hosokawa Micron, trade name, made by K. K. Hosokawa Tekkosho) and the compression degree (C) is obtained by the following equation;

$$C(\%) = \frac{P - A}{A} \times 100$$

When the compression degree was less than 20%, the fluidity of the polymer particles was good and then such a case was defined as satisfied.

3. Brocking property of Polymer

After placing 200 parts of each polymer sample in a 250 milliliter glass bottle having a diameter of 7 cm and a height of 10 cm, the bottle was closed and stored for one week at 40° C. Thereafter, the aggregated extent of the polymer particles was evaluated by means of the aforesaid powder tester. That is, 100 parts of the aforesaid sample was placed in the powder tester equipped with a 5 mesh sieve (1st stage), a 10 mesh sieve (2nd stage), and a 16 mesh sieve (3rd stage) and after applying thereto a jolt for 30 seconds, the amount retained on each sieve was weighed and the aggregated degree (D) was calculated by the following equation;

$$D(\%) = \text{(amount on 1st stage sieve (\%))} + \text{(amount on 2nd stage sieve (\%))} \times 3/5) + \text{(amount on 3rd stage sieve (\%))} \times 1/5)$$

When the aggregated degree (D) was less than 20%, there was no problem about the blocking property and hence the case was defined as satisfied.

4. Transparency of Blend

A blend of 100 parts of PVC having a polymerization degree of 800, 1.5 parts of octyltin mercapto, 1 part of glycerol monostearate, and 5 parts of the polymer in the example was kneaded for 4 minutes by two mixing rolls at 190° C. and further press molded for 4 minutes at 190° C. to form a sheet of 1 mm in thickness. The light transmittance of the sheet thus obtained was measured using a haze meter. When the transparency was not lower than 85%, there was no problem for practical use and hence the case was defined as satisfied.

EXAMPLE 1

In a two liter electromagnetic stirring type autoclave were charged 400 parts of vinyl acetate, 900 parts of ion-exchanged water, 10 parts of sodium laurylsulfate, 2 parts of hydroxyethyl cellulose, 2 parts of colloid palladium (0.1% aqueous solution), and 0.002 part of ammonium ferric sulfate and after displacing the air in the autoclave with nitrogen, ethylene was prepared in the autoclave to a pressure of 53 kg/cm$^2$ at 30° C. Then, while adding dropwise 50 parts of a 5% aqueous solution of potassium persulfate to the mixture, the reaction was performed for 6 hours at 30° C. Residual ethylene was released and the temperature and pressure of the system were allowed to reduce to room temperature and normal pressure, respectively, to provide 1510 parts of a VEE resin emulsion having a vinyl acetate content of 64%.

After diluting the emulsion to 15% in concentration and heating it to 50° C., 60 parts of an aqueous solution of 10% calcium chloride was added to the emulsion to precipitate the polymer formed. Then, the temperature of the system was raised to 95° C. and after aging for 30 minutes, the system was cooled.

After the VEE resin was washed with water to remove the dispersing agent, etc., the VEE resin was placed in a two liter separable flask equipped with a stirrer. Then, 17 parts of stearic acid in flake form and 600 parts of distilled water were further added thereto and the temperature of the mixture was raised to 95° C. with stirring. Then, after keeping the mixture at the temperature for 30 minutes, the mixture was cooled below 40° C. with stirring. The powdery VEE resin coated with molten stearic acid was collected, dehydrated and dried for 20 hours at 50° C. to obtain 595 parts of the polymer. The form and the properties of the polymer thus obtained were evaluated and the results obtained are shown in Table 1 below.

EXAMPLES 2 TO 5

By following the same procedure as Example 1 using 40 parts of stearic acid (Example 2), 17 parts of glycerol monostearate (Example 3), 17 parts of paraffin wax (Example 4), and 17 parts of behenyl alcohol (Example 5) in place of 17 parts of stearic acid in Example 1, polymers were prepared. The form and the properties of each polymer were evaluated and the results obtained are shown in Table 1 below.

COMPARISON EXAMPLES 1 TO 3

The VEE resin before the addition of stearic acid in Example 1 was dehydrated and dried for 20 hours at 50° C. to provide the sample in Comparison Example 1. Also, after dehydrating the VEE resin before the addition of stearic acid in Example 1, the resin was mixed with 17 parts of fine-powdery calcium stearate (made by Sakai Kagaku K.K.) and dried for 20 hours at 50° C. to provide the sample in Comparison Example 2. Furthermore, by following the same procedure as Comparison Example 2 using 40 parts of calcium stearate in place of 17 parts of barium stearate, the sample of Comparison Example 3 was obtained. The form and the properties of each polymer obtained were evaluated and the results obtained are shown in Table 1 below.

EXAMPLE 6

By dissolving 210 parts of a bulk copolymer of vinyl acetate-ethylene having a vinyl acetate content of 45% in tertiary butyl alcohol, 525 parts of a tertiary butyl alcohol solution of 40% in concentration was prepared and the solution was gradually added dropwise to a large amount of aqueous medium with sufficiently stirring to deposit a polymer in powdery state. The powdery polymer thus deposited was collected, sufficiently washed with water of 40° C., and placed in a two liter separable flask equipped with a stirrer. Then, 10 parts of stearic acid in flake form and 250 parts of distilled water were added thereto and the temperature of the mixture was raised to 85° C. with stirring. After keeping the mixture at the temperature for 30 minutes, the mixture was cooled below 40° C. with stirring. The polymer obtained was dehydrated, air-dried a whole day and night, and then further dried for 20 hours at 50° C. to provide 202 parts of a vinyl acetate-ethylene copolymer coated with stearic acid. The form and the properties of the polymer obtained were evaluated and the results are shown in Table 1 below.

EXAMPLE 7

Raw materials shown below were placed in a two liter electromagnetic stirrer type cutoclave.

| | |
|---|---|
| Methyl Acrylate | 40 parts |

-continued

| | |
|---|---|
| Vinyl Acetate | 120 parts |
| Azo-bis-isobutyronitrile | 1.6 parts |
| Polyvinyl Alcohol | 1.6 parts |
| Sodium Polyacrylate | 0.8 parts |
| Distilled Water | 600 parts |

Then, after displacing the air in the autoclave with nitrogen, ethylene was introduced into the autoclave to a pressure of 54 kg/cm$^2$ at 30° C. and then after raising the internal temperature to 65° C., a suspension polymerization was performed for 9 hours. Remaining ethylene was released and the temperature and the pressure of the system were allowed to reduce to room temperature and normal pressure, respectively, to provide an aqueous dispersion containing 39% of a ternary copolymer having an ethylene content of 33%. The aqueous dispersion was diluted with water to a concentration of 15% and after heating the dispersion to 50° C., 20 parts of an aqueous solution of 10% aluminum sulfate was added thereto to deposit a polymer. Then, the temperature of the system was raised to 80° C. and after aging for 30 minutes at the temperature, the system was cooled. The fine-powdery tertiary copolymer thus formed was collected, washed with water, placed in a two liter separable flask equipped with a stirrer, and after further adding thereto 11 parts of stearic acid in flake form and 240 parts of distilled water, the temperature of the mixture was raised to 85° C. with stirring. After keeping the mixture at the temperature for 30 minutes, the mixture was cooled below 40° C. with stirring. The tertiary copolymer coated with molten stearic acid thus obtained was dehydrated and dried for 20 hours at 50° C. to obtain 225 parts of the polymer. The form and the properties of the polymer were evaluated and the results obtained are shown in Table 1 below.

EXAMPLE 8

In a two liter electromagnetic stirring type autoclave were charged 150 parts of vinyl acetate, 450 parts of water, 1.5 parts of azobis-isobutyronitrile, 1.8 parts of polyvinyl alcohol, and 1.0 part of sodium polyacrylate. Then, after displacing the air in the autoclave with nitrogen, ethylene was introduced to a pressure of 62 kg/cm$^2$ at 30° C. and after increasing the internal temperature thereof to 65° C., a suspension polymerization was performed for 9 hours. Residual ethylene was gradually released, 56 parts of vinyltoluene (solubility parameter of 9.0) were added thereto at room temperature and absorbed in the polymer particles. Thereafter, the temperature of the system was raised to 70° C. and a reaction was performed under a graft polymerization condition for 5 hours. Thus, a suspension containing a ternary graft copolymer (solubility parameter of 8.9) of vinyl acetate, ethylene and vinyltoluene was obtained. The copolymer was collected, washed with water, and then placed in a two liter separable flask equipped with s stirrer. Then, 5 parts of stearyl alcohol in flake form and 250 parts of distilled water were further added thereto and the temperature of the mixture was raised to 85° C. with stirring. After keeping the mixture at the same temperature for 30 minutes, the mixture was cooled below 40° C. with stirring. The ternary copolymer coated with molten stearyl alcohol was dehydrated and dried for 20 hours at 50° C. to provide 265 parts of the polymer. The form and the properties of the polymer were evaluated and the results obtained are shown in Table 1 below.

TABLE 1

| | Example | | | | | |
|---|---|---|---|---|---|---|
| | 1 | 2 | 3 | 4 | 5 | 6 |
| Polymer Composition (weight ratio) | Vinylacetate/ ethylene = 64/36 | Vinylacetate/ ethylene = 64/36 | Vinylacetate/ ethylene = 64/36 | Vinylacetate/ ethylene = 64/36 | Vinylacetate/ ethylene = 64/36 | Vinylacetate/ ethylene = 45/55 |
| Sticking Preventing Agent (m.p.) Amount (parts) [to 100 parts of polymer] | Stearic acid (67° C.) 3 | Stearic acid (67° C.) 7 | Glycelol mono-stearate (65° C.) 3 | Paraffin wax (83° C.) 3 | Behenyl Alcohol (75° C.) 3 | Stearic acid (67 20 C.) 5 |
| Powdering Property of Polymer | accepted | accepted | accepted | accepted | accepted | accepted |
| Average particle Size (mesh) | 22 | 17 | 23 | 19 | 18 | 21 |
| Fluidity of Polymer Particles | accepted | accepted | accepted | accepted | accepted | accepted |
| Compression degree (%) | 12 | 9 | 11 | 11 | 12 | 14 |
| Blocking Property of Polymer Particles | accepted | accepted | accepted | accepted | accepted | accepted |
| Aggregated degree (%) | 8 | 4 | 6 | 6 | 7 | 4 |
| Transparency of Blend | accepted | accepted | accepted | accepted | accepted | accepted |
| Light Transmittance (%) | 93 | 91 | 94 | 90 | 92 | 87 |
| Total Evaluation | accepted | accepted | accepted | accepted | accepted | accepted |

| | Example | | Comparison Example | | |
|---|---|---|---|---|---|
| | 7 | 8 | 1 | 2 | 3 |
| Polymer Composition (weight ratio) | Vinylacetate/ ethylene/methyl-acrylate = 50/33/17 | Vinylacetate/ ethylene/vinyl-toluene = 51/30/19 | Vinylacetate/ ethylene = 64/36 | Vinylacetate/ ethylene = 64/36 | Vinylacetate/ ethylene = 64/36 |
| Sticking Preventing Agent (m.p.) Amount (parts) [to 100 parts of | Stearic acid (67° C.) | Stearyl Alcohol (63° C.) | None | Calcium Stearate | Calcium Stearate |

TABLE 1-continued

| | | | | | |
|---|---|---|---|---|---|
| polymer] | 5 | 1.9 | | 3 | 7 |
| Powdering Property of Polymer | accepted | accepted | failure | failure | accepted |
| Average particle Size (mesh) | 22 | 27 | >7 | 6 | 33 |
| Fluidity of Polymer Particles | accepted | accepted | unmeasurable | accepted | failure |
| Compression degree (%) | 15 | 7 | | 18 | 28 |
| Blocking Property of Polymer Particles | accepted | accepted | unmeasurable | failure | accepted |
| Aggregated degree (%) | 4 | 0 | | 48 | 8 |
| Transparency of Blend | accepted | accepted | accepted | accepted | failure |
| Light Transmittance (%) | 92 | 94 | 93 | 86 | 78 |
| Total Evaluation | accepted | accepted | failure | failure | failure |

While the invention has been described in detail and with reference to specific embodiments thereof, it will be apparent to one skilled in the art that various changes and modifications can be made therein without departing from the spirit and scope thereof.

What is claimed is:

1. A powdery vinyl ester-ethylene copolymer composition, which does not agglomerate on storage, comprising particles of a vinylester-ethylene copolymer coated with a wax having a melting point of at least 40° C., said particles being coated at a temperature of at least the melting point of the wax.

2. The composition as claimed in claim 1, wherein the ratio of vinyl ester/ethylene is from 30/70 to 80/20 by weight.

3. The composition as claimed in claim 1, wherein the copolymer is obtained by grafting a vinyl monomer to a vinyl ester-ethylene copolymer.

4. The composition as claimed in claim 1, wherein the melting point of the wax is from 40° C. to 100° C.

5. The composition as claimed in claim 1, wherein the content of the wax is from 0.5 to 10 parts by weight per 100 parts by weight of the copolymer of vinyl ester-ethylene.

6. A resin composition comprising a vinyl chloride resin and a powdery vinyl ester-ethylene copolymer coated with a wax having a melting point of at least 40° C., said particles being coated at a temperature of at least the melting point of the wax.

7. The resin composition as claimed in claim 6, wherein the ratio of vinyl ester/ethylene is from 30/70 to 80/20 by weight.

8. The resin composition as claimed in claim 6, wherein the proportion of the treated powdery copolymer of vinyl ester-ethylene in the resin composition is from 1 to 100 parts by weight per 100 parts by weight of the vinyl chloride resin.

* * * * *